United States Patent Office 3,729,479
Patented Apr. 24, 1973

3,729,479
2-(SUBSTITUTED INDAZOLYL-N'-METHYL)-
2-THIOPSEUDOUREA SALTS
Pasquale P. Minieri, Woodside, N.Y., assignor to
Tenneco Chemicals, Inc.
No Drawing. Continuation-in-part of application Ser. No.
689,812, Dec. 12, 1967, now Patent No. 3,641,050,
dated Feb. 8, 1972. This application May 6, 1971, Ser.
No. 140,958
Int. Cl. C07d 49/18
U.S. Cl. 260—310 C
5 Claims

ABSTRACT OF THE DISCLOSURE

Compounds that have the structural formula

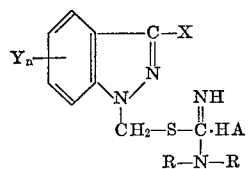

wherein X represents hydrogen or halogen; Y represents halogen or nitro; each R represents hydrogen or a lower alkyl group; $n$ represents an integer in the range of zero to 2; and A represents the anion of a strong acid, are used to control the growth of fungi. Among the most active of these compounds are 2-(5-nitroindazolyl-$N^1$-methyl)-2-thiopseudourea hydrochloride and 2 - (3 - chloro - 6 - nitroindazolyl - $N^1$ - methyl) - 2 - thiopseudourea hydrochloride.

---

This is a continuation-in-part of my copending application Ser. No. 689,812, which was filed on Dec. 12, 1967 and which is now U.S. Pat. No. 3,641,050.

This invention relates to salts of 2-(substituted indazolyl-$N^1$-methyl)-2-thiopseudourea and to the use of these compounds in the control of fungi.

In accordance with this invention, it has been found that certain 2 - (substituted indazolyl - $N^1$ - methyl)-2-thiopseudourea salts have unusual and valuable activity as agricultural and industrial fungicides. These compounds may be represented by the structural formula

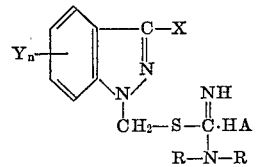

wherein X represents hydrogen, chlorine, bromine, fluorine, or iodine; Y represents chlorine, bromine, fluorine, iodine, or nitro; each R represents hydrogen or an alkyl group having from 1 to 4 carbon atoms; $n$ represents an integer in the range of zero to 2; and A represents the anion of a strong acid such as hydrochloric acid; hydrobromic acid, hydroiodic acid, phosphoric acid, or sulfuric acid.

Particularly effective as fungicides are the 2-thiopseudourea salts having the aforementioned structural formula wherein X is hydrogen or chlorine, Y is nitro or chlorine, each R is hydrogen, methyl, or ethyl, and HA is hydrochloride. Illustrative of these compounds are the following:

2-(5-chloroindazolyl-$N^1$-methyl)-2-thiopseudourea
  hydrochloride,
2-(6-nitroindazolyl-$N^1$-methyl)-2-thiopseudourea
  hydrochloride,
2-(6-nitroindazolyl-$N^1$-methyl)-3-methyl-2-thiopseudourea hydrochloride, 2-(6-chloroindazolyl-$N^1$-methyl)-3-ethyl-2-thiopseudourea, hydrochloride,
2-(6-chloroindazolyl-$N^1$-methyl)-3,3-dimethyl-2-thiopseudourea hydrochloride,
2-(3-chloro-6-nitroindazolyl-$N^1$-methyl)-2-thiopseudourea hydrochloride, and the like.

The novel fungicidal compounds may be prepared by any suitable and convenient procedure. For example, they may be prepared by the reaction of the appropriate $N^1$-chloromethylindazole with thiourea or an alkylthiourea. The reaction is generally carried out in a solvent, such as acetone, methyl ethyl ketone, pyridine, ethanol, ethylene dichloride, or benzene, at the reflux temperature of the reaction mixture. Suitable $N^1$-chloromethyl-indazoles may be obtained by heating a substituted indazole with paraformaldehyde to form the corresponding $N^1$-hydroxymethyl compound and then heating the $N^1$-hydroxymethyl compound with thionyl chloride to form the $N^1$-chloromethyl compound.

In a preferred embodiment of the invention, the compounds of this invention are used to control the growth of plant pathogens, including those responsible for early blight and late blight of tomatoes, powdery mildew of beans, and other serious crop diseases.

While the fungicidal compounds of this invention may be applied as such, they are ordinarily and preferably combined with an inert fungicidal adjuvant carrier and applied as a solution, emulsion, suspension, or dust. Aqueous solutions or suspension that contain about 0.001 percent to 1 percent by weight and preferably 0.01 percent to 0.5 percent by weight, of the active agent are particularly suitable for this use. These compositions may also contain about 0.01 percent to 0.1 percent by weight of a wetting agent, such as an alkyl sulfate, an alkyl aryl sulfonate, a sulfosuccinate, a polyethylene glycol ether, and the like. Alternatively, the fungicidal compounds may be dissolved in an organic solvent, such as acetone, naphtha, ethylene chloride, or kerosene, and applied as solutions, or they may be mixed with or deposited upon such finely-divided solid carriers as clay, chalk, bentonite, talc, kaolin, fuller's earth, and the like and applied as dusts.

The fungicidal compounds may be applied by known techniques to plants, to plant seeds, or to the soil in which plants are growing or are to be grown. They may be applied to the parts of the plants above or in the soil, or the plant seeds may be contacted with the fungicidal compound. Alternatively, the fungicide may be introduced into the soil near the roots of the plants or applied to the surface of the soil and then mixed into the soil to the desired depth.

The amount of the fungicidal composition that is applied is dependent upon such factors as the species of plant being treated and the plant pathogen whose control is desired and is that amount which will inhibit or prevent the growth of the plant pathogen while causing little or no injury to the plants. About 1 pound to 200 pounds of the active compound is ordinarily applied per acre, with particularly good results being obtained when 5 pounds to 35 pounds per acre is used.

The compounds of this invention may be used as the sole active component of the fungicidal compositions. If desired, however, the compositions may also contain other fungicides, such as sulfur and the metal dimethyldithiocarbamates; insecticides, such as benzene hexachloride; or plant nutrients, such as urea, ammonium nitrate, and potash.

In other preferred embodiments of this invention, the novel compounds are used to impart fungal resistance to a wide variety of materials that are subject to deterioration resulting from attack by fungi. These include, for example, surface-coating compositions, vinyl halide and other resins, paper, textiles, leather, wood, and the like.

The invention is further illustrated by the examples that follow.

EXAMPLE 1

A mixture of 25 grams (0.124 mole) of $N^1$-chloromethyl-5-chloroindazole, 9.4 grams (0.124 mole) of thiourea, and 250 ml. of acetone was heated to its reflux temperature with stirring, heated at that temperature for one hour, cooled to room temperature, and filtered. The product was washed with acetone and dried. There was obtained 21.5 grams of 2-(5-chloroindazolyl-$N^1$-methyl)-2-thiopseudourea hydrochloride that melted at 165°–170° C. and that contained 20.97 percent N, 22.94 percent Cl, and 15.29 percent S (calculated, 20.3 percent N, 25.8 percent Cl, and 11.6 percent S). The structure of the compound was confirmed by infrared analysis.

EXAMPLE 2

The procedure described in Example 1 was repeated using $N^1$-chloromethyl-5-nitroindazole, thiourea, and acetone. There was obtained a 93.4 percent yield of 2-(5-nitroindazolyl-$N^1$-methyl)-2-thiopseudourea hydrochloride that melted at 207° C. (dec.) and that contained 11.4 percent S and 24.9 percent N (calculated, 11.6 percent S and 24.5 percent N).

EXAMPLE 3

A mixture of 21.2 grams (0.1 mole) of $N^1$-chloromethyl-6-nitroindazole, 7.6 grams (0.1 mole) of thiourea, and 150 ml. of acetone was heated to its reflux temperature with stirring, heated at that temperature for one hour, cooled to room temperature, and filtered. The product was washed with acetone and then dried under vacuum for three hours. There was obtained 27.5 grams (96 percent yield) of 2-(6-nitroindazolyl-$N^1$-methyl)-2-thiopseudourea hydrochloride that melted at 217° C. (dec.) and that contained 24.6 percent N, 15.5 percent Cl, and 13.7 percent S (calculated, 24.5 percent N, 12.4 percent Cl, and 11.6 percent S). The structure of the compound was confirmed by infrared analysis.

EXAMPLE 4

The procedure described in Example 3 was repeated using $N^1$-chloromethyl-6-nitroindazole, methylthiourea, and acetone. There was obtained 2-(6-nitroindazolyl-$N^1$-methyl)-3-methyl-2-thiopseudourea hydrochloride that contained 24.5 percent N (calculated, 24.3 percent N).

EXAMPLE 5

The procedure described in Example 3 was repeated using $N^1$-chloromethyl-6-nitroindazole, ethylthiourea, and acetone. There was obtained 2-(6-nitroindazolyl-$N^1$-methyl)-3-ethyl-2-thiopseudourea hydrochloride that contained 24.3 percent N (calculated, 24.2 percent N).

EXAMPLE 6

(A) A mixture of 71 grams (0.3566 mole of 3-chloro-6-nitroindazole, 16.1 gram (0.537 mole) of paraformaldehyde, 5.5 ml. of 5 percent aqueous sodium hydroxide solution, and 400 ml. of ethanol was heated at its reflux temperature for 2.75 hours and then cooled in an ice bath. There was obtained 54 grams of $N^1$-hydroxymethyl-3-chloro-6-nitroindazole that melted at 152.5°–154° C.

(B) A mixture of 35 grams of $N^1$-hydroxymethyl-3-chloro-6-nitroindazole, 39 grams of thionyl chloride, and 350 ml. of ethylene dichloride was heated at its reflux temperature for 3.5 hours, cooled to room temperature, and allowed to stand at room temperature overnight. After removal of the solvent, the product was recrystallized from 80 ml. of ethylene dichloride. The $N^1$-chloromethyl-3-chloro-6-nitroindazole obtained melted at 157.5°–159° C.

(C) A mixture of 31.5 grams of $N^1$-chloromethyl-3-chloro-6-nitroindazole, 9.77 grams of thiouera, and 157.5 ml. of acetone was heated with stirring to its reflux temperature. An additional 50 ml. of acetone was added, and the heating was continued for 30 minutes. The reaction mixture was cooled to room temperature and filtered. The product was washed with acetone and dried. There was obtained 39.5 grams (96 percent yield) of 2-(3-chloro-6-nitroindazolyl-$N^1$-methyl) - 2-thiopseudourea hydrochloride that melted at 213° C. (dec.) and that contained 21.58 percent N, 10.22 percent S, and 22.21 percent Cl (calculated, 21.95 percent N, 9.93 percent S, and 22.05 percent Cl). The structure of the compound was confirmed by infrared analysis.

EXAMPLE 7

Acetone solutions were prepared by dissolving 100 mg. portions of the products of Examples 1–6 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the fungicidal compounds. More dilute solutions were prepared by adding distilled water to these solutions.

EXAMPLE 8

Tomato plants that were 6–8 inches tall were sprayed until the liquid dripped from the leaves with aqueous solutions prepared by the procedure of Example 7. When the plants had dried, they were sprayed with suspensions of the spores of *Phytophthora infestans*, the fungus that causes tomato late blight. One week after treatment, the degree of suppression of the disease was noted. In no case was there appreciable injury to the plants. The results obtained are summarized in Table I.

TABLE I

Activity of 2-(Substituted Indazolyl-$N^1$-Methyl)-2-Thiopseudourea Salts as Foliar Fungicides

| Biocide | Rate (p.p.m.) | Percent control of late blight of tomatoes |
|---|---|---|
| 2-(5-chloroindazolyl-$N^1$-methyl)-2-thiopseudourea·HCl | 1,000 | 100 |
| | 500 | 100 |
| | 250 | 99 |
| | 125 | 83 |
| | 60 | 42 |
| 2-(5-nitroindazolyl-$N^1$-methyl)-2-thiopseudourea·HCl | 1,000 | 100 |
| | 500 | 100 |
| | 250 | 99 |
| | 125 | 95 |
| | 60 | 86 |
| | 30 | 58 |
| 2-(6-nitroindazolyl-$N^1$-methyl)-2-thiopseudourea·HCl | 1,000 | 100 |
| | 500 | 100 |
| | 250 | 98 |
| | 125 | 57 |
| | 60 | 20 |
| 2-(6-nitroindazolyl-$N_1$-methyl)-3-ethyl-2-thiopseudourea·HCl | 1,000 | 48 |
| 2-(3-chloro-6-nitroindazolyl-$N^1$-methyl)-2-thiopseudourea·HCl | 1,000 | 100 |
| | 500 | 99 |
| | 250 | 96 |
| | 125 | 91 |
| | 60 | 89 |
| | 30 | 52 |

Each of the other 2-(substituted indazolyl-$N^1$-methyl)-2-thiopseudourea salts disclosed herein can be used in a similar way to control the growth of fungi.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:
1. A compound having the structural formula

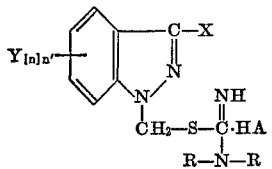

wherein X represents hydrogen or halogen, Y represents halogen or nitro, each R represents hydrogen or alkyl of 1 to 4 carbon atoms, $n'$ represents an integer in the range of 1 to 2, and A represents halide, sulfate, or phosphate.

2. The compound as set forth in claim 1 that is 2-(5-nitroindazolyl-$N^1$-methyl) - 2-thiopseudourea hydrochloride.

3. The compound as set forth in claim 1 that is 2-(5-chloroindazolyl-$N^1$-methyl) - 2-thiopseudourea hydrochloride.

4. The compound as set forth in claim 1 that is 2-(3-chloro-6-nitroindazolyl) - $N^1$-methyl) - 2-thiopseudourea hydrochloride.

5. The compound as set forth in claim 1 that is 2-(6-nitroindazolyl-$N^1$ - methyl)-3-ethyl-2-thipseudourea hydrochloride.

References Cited
FOREIGN PATENTS
1,814,335  8/1969  Germany _____ 260—310 C

OTHER REFERENCES
Chemical Abstracts Subject Index (J–Z), vol. 71, pp. 2929S–30S (1969).

Agova et al.: Chem. Abst., vol. 61, column 5637 (1964).

Borovicka et. al.: Chem. Abst., vol. 49, column 10947 (1955).

Lane: Chem. Abst., vol. 53, volume 14091 (1959).

NATALIE TROUSOF, Primary Examiner

U.S. Cl. X.R.

424—273